H. A. PERKINS.
STEP BEARING FOR MACHINERY.
APPLICATION FILED FEB. 10, 1908.

1,059,313.

Patented Apr. 15, 1913.

WITNESSES:
C. M. Catlin
W. M. Corbett

INVENTOR
H. A. Perkins
BY
Benj. R. Catlin
ATTORNEY

UNITED STATES PATENT OFFICE.

HIRAM A. PERKINS, OF ROCHESTER, NEW YORK, ASSIGNOR TO AMERICAN WOOD WORKING MACHINERY CO., OF ROCHESTER, NEW YORK, A CORPORATION OF PENNSYLVANIA.

STEP-BEARING FOR MACHINERY.

1,059,313. Specification of Letters Patent. Patented Apr. 15, 1913.

Application filed February 10, 1908. Serial No. 415,266.

*To all whom it may concern:*

Be it known that I, HIRAM A. PERKINS, of the city of Rochester, in the county of Monroe and State of New York, have invented a new and useful Improvement in Step-Bearings for Machinery, of which the following is a specification.

The object of my invention is to provide an end bearing for vertical spindles which shall be durable, self lubricating, and removable in case of injury, without damage to the spindle or its adjacent parts, and its nature will appear in the sub-joined description.

Figure 1:
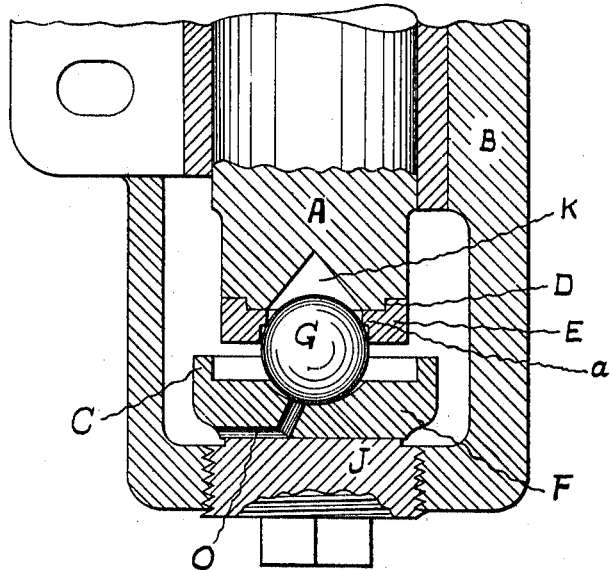
Figure 2:
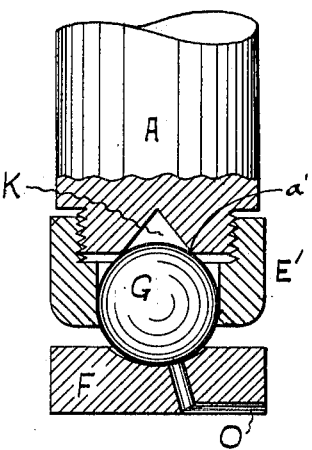

In the drawings Figure 1 is a vertical section of a step bearing showing my improvement. Fig. 2 is a sectional view of a modification of the ball collar and mode of attachment.

A is a vertical spindle running in side bearings B, of any of the usual forms, and having preferably the cup shape below provided with a removable screw plug J, all substantially as shown. The lower end of this spindle is preferably hollowed out as at K, to give ball G, clearance, cavity K, being coaxial with the spindle.

E is a clamping or holding collar which slips over the end of the spindle A, or over a portion of it of reduced diameter, as at D, Fig. 1. This collar is bored out to receive the ball G, which is preferably somewhat smaller in diameter than the spindle A, and is held in place by being driven or pressed tightly into the bore of the collar E.

I prefer to bore the collar E, so that the ball will pinch into it, at, or about at the center plane of the ball, and that the collar be recessed a trifle, leaving a ring or ledge *a*, against which the ball can rest, and thus receive the thrust of the spindle, but any form of retaining collar which forces the ball to revolve coaxially with the spindle would effect my purpose. In some cases a shoulder *a'* on the end of the spindle may be used in place of said ledge *a*. As the collar E, is coaxial with spindle A, and the seat for the ball is coaxial with the collar, it follows that the ball center is in line with the spindle axis. It is a characteristic of my invention that the ball or approximately spherical bearing part has no independent rotation, but is fixed to the spindle. The friction between the collar and the spindle at the point D, is sufficient at all times to keep the collar E, and ball G, in fixed relation and so that in operation the wear caused by the thrust of the spindle is confined to the ball and its step bearing.

F, is a step plate provided on its upper surface with a cavity to receive a portion of the ball G, loosely.

C, is a well or cup which may be a part of the step plate F, if desired, and is kept partly or wholly filled with lubricating oil. It will be observed that the ball G, can be removed from the collar E, by pressure, and when worn on one side can be replaced with another portion of its surface exposed where it rests in the step plate; and when worn out of sphericity can be replaced with a new ball at slight expense, thus not affecting the main spindle A, in any way.

J, is an adjusting screw bearing against the step plate, as is usual in such bearings, and in connection with a suitable shoulder or collar on spindle A, operates to prevent end motion of the spindle.

I have shown in Fig. 2 a modification of the method of driving the ball G, which consists in threading the collar E', upon the shouldered part of the spindle, and thus clamping the ball into the conical recess K. In this construction also the ball is removable and always coaxial with the spindle and with the step plate F'.

The several constructions illustrated have this in common, that each has connected to the end of its spindle a collar which in use rotates only with the spindle. Each construction has a step plate with a concave bearing, and each has a rounded part which bears in the step plate concavity and rotates only with the collar and spindle. In the constructions of Figs. 1, 2 and 3 said rounded parts are the lower sides of the balls.

I am aware that freely rotatable balls, one or more, have been employed in step bearings. My improvement contemplates a rounded bearing normally fixed to an adjustable part removably connected to the spindle whereby the bearing surface may be renewed when worn.

Having thus described my invention, what I claim and desire to secure by Letters Patent is:

1. The combination of a rotary spindle, a collar removably fixed to an end thereof so as, in use, to rotate with and only with the spindle, a ball non-rotatably but removably secured in said collar, there being an angular shoulder against which the ball non-rotatably held in the collar bears, and a step plate.

2. The combination of the spindle, the step plate, a bearing comprising an approximately spherical part situated below the foot of the spindle and carried mediately by it, and means for fixing the said bearing to the spindle and against independent rotation, said spherical part and fixing means being normally fixed together, and rotatable with and detachable from the spindle, whereby when the ball becomes worn on one side it can be loosened and turned to bring an unworn side into bearing position.

HIRAM A. PERKINS.

Witnesses:
F. H. CLEMENT,
G. C. SOUTHARD.